United States Patent [19]

Tsuchihashi

[11] Patent Number: 5,059,362

[45] Date of Patent: Oct. 22, 1991

[54] METHOD OF MAKING A COMPOSITE FOAMED AND SHAPED ARTICLE

[75] Inventor: Hiroshi Tsuchihashi, Funabashi, Japan

[73] Assignee: Toray Engineering Co., Ltd., Osaka, Japan

[21] Appl. No.: 425,931

[22] Filed: Oct. 24, 1989

[30] Foreign Application Priority Data

Oct. 24, 1988 [JP] Japan ................................ 63-267454

[51] Int. Cl.$^5$ .............................................. B29C 41/18
[52] U.S. Cl. ...................................... 264/25; 264/45.1; 264/46.4; 264/126; 264/255; 264/302
[58] Field of Search ...................... 264/45.1, 255, 301, 264/302, 126, 25, 46.4

[56] References Cited

U.S. PATENT DOCUMENTS

| | | | |
|---|---|---|---|
| 2,588,571 | 3/1952 | Porter | 264/327 |
| 2,950,505 | 8/1960 | Frank | 264/255 |
| 3,493,994 | 2/1970 | Wersosky et al. | 425/407 |
| 3,617,588 | 11/1971 | Langman | 264/DIG. 37 |
| 3,832,117 | 8/1974 | Hijikata et al. | 264/25 |
| 4,217,325 | 8/1980 | Colby | 264/255 |
| 4,606,868 | 8/1986 | Christoph et al. | 264/302 |
| 4,692,293 | 9/1987 | Gray | 264/310 |

FOREIGN PATENT DOCUMENTS

| | | | |
|---|---|---|---|
| 42-11510 | 6/1967 | Japan . | |
| 54-003905 | 2/1979 | Japan | 264/45.1 |
| 62-037112 | 2/1987 | Japan | 264/302 |
| 62-253417 | 11/1987 | Japan | 264/302 |
| 63-27167 | 6/1988 | Japan . | |

*Primary Examiner*—Robert A. Dawson
*Assistant Examiner*—Allan R. Kuhns
*Attorney, Agent, or Firm*—Burns, Doane, Swecker & Mathis

[57] ABSTRACT

A method of making a composite foamed and shaped article including in the first step in which a thermoplastic resin powder is filled in a slush molding die to form a first resin layer, a second step in which a mixed powder consisting of a heat decomposable foaming agent and the thermoplastic resin powder is filled in the die in which the first resin layer was already formed, to form a second resin layer on the surface of the first resin layer, and a third step in which the heat decomposable foaming agent is made to foam by heat treatment to form a final product of a composite foamed and shaped article wherein the slush molding die is pre-heated by an infrared heating method.

18 Claims, No Drawings

METHOD OF MAKING A COMPOSITE FOAMED AND SHAPED ARTICLE

BACKGROUND OF THE INVENTION

1. Field of the Invention

The present invention relates to a method for making a composite foamed and shaped article suitable for use for the interior of cars or surface fitting of furniture.

2. Description of the Related Art

A method for making a composite foamed and shaped article suitable for use for the interior of cars or surface fitting of furniture utilizing the powder slushing method is already known.

For example, a method of making a composite foamed and shaped article, is disclosed in Japanese Examined patent publication ( KOKOKU ) No.42-11510, including a first step in which a thermoplastic resin powder is fied in a heated slush molding die which is then heated so as to form a first resin layer and then the surplus thermoplastic resin powder is discharged; a second step in which a mixed powder consisting of heat decomposable foaming agent and the thermoplastic resin powder is filled in the slush molding die where the first resin layer is formed and then reheated to form a sintered second resin layer on the first resin layer and then the surplus mixed resin powder is discharged and a third step in which the slush molding die in which the first and the second resin layers are formed is further heated to foam the second resin layer and then the die is cooled and the foamed and shaped article is taken out from the die.

In this method, however, the slush molding die is heated to form the sintered resin layer in the first and the second steps, so it takes a relatively long time to obtain a shaped article, which is disadvantageous in productivity.

To overcome this problem in the prior art, another proposal Japanese Examined Patent Publication ( KOKOKU ) No.63-27167 discloses a first step in which a thermoplastic resin powder is filled in a preheated slush molding die to form a first resin layer and a second step in which a mixed powder is filled in the slush molding die and heated to be adhered to the first resin layer, utilizing the remaining heat of the die, to form a second resin layer.

Even utilizing this method, however, the time required to produce a single shaped article, i.e., the molding time, cannot sufficiently be shortened.

That is, in a conventional molding die heating method utilizing heated air or the like, a problem arises in that it is difficult to rapidly and uniformly heat a molding die with heated air.

Therefore, even if the heating of the molding die in the second step is eliminated, the time required to produce a shaped article cannot be sufficiently shortened.

That is, a heating method has never been obtained which can fully meet with these conditions.

The hot air heating method is the most typical heating method.

However, in this method, air is heated and the die is heated by the thus heated air.

Air has an extremely low coefficient of thermal conductivity.

Accordingly, a lot of heat sources are required to heat the heating medium per se, and the heating time is naturally extended.

Further, it is difficult for the die to be heated uniformly.

On the other hand, there is a method in which use is made of oil as a heating medium. Oil is heated by a suitable heating source and supplied to conduits arranged on the outer peripheral surface of the die to heat it.

This method has an advantage over the air heating method in view of the heating medium (the coefficient of thermal conductivity of oil is higher than that of air), but the heating temperature of the die can be easily be affected by the degree of contact between the die and the conduits the position on the outer surface of the die on which the conduits are installed, the number of the conduits installed per unit area of the surface of the die, etc.

Thus, a lot of time and expense are required for manufacturing he die and for heating tests.

Further, the die cannot be heated sufficiently uniformly and rapidly in spite of taking a lot of time and expense.

Moreover, a cooing oil should be prepared to cool the die.

In the induction heating method, induction coils are arranged on the outer peripheral surface of the die and actuated through an oscillator.

Since the induction coils are installed on the outer surface of the die, however this method has the same drawbacks as the oil heating method.

SUMMARY OF THE INVENTION

To overcome this problem, many countermeasures have been considered.

Finally it was found that heating the molding die by infrared ray is the best.

Therefore, according to the present inveintion, there is provided a method for making a composite foamed and shaped article including a first step in which a heated slush molding die is filled with a thermoplastic resin powder to form a first resin layer and then the surplus thermoplastic resin powder is discharged, a second step in which the die with the first resin layer formed therein is filled with a mixed powder consisting of a heat decomposable foaming agent and the thermoplastic resin powder, the remaining heat of the die is utilized and the mixed powder brought into contact with the first resin layer to form a second resin layer, and the surplus mixed resin powder is discharged, and a third step in which the second resin layer is subjected to heat treatment to cause foaming and the die is cooled then the foamed and shaped article is taken out therefrom.

The feature of this method is that the slush molding die in which the thermoplastic resin powder is later contained is heated, before the first step is carried out, by an infrared heating method utilizing an infrared gas burner in an atmosphere in which air is agitated by an air agitating device.

DESCRIPTION OF THE PREFERRED EMBODIMENTS

The preferred embodiments of the present invention will be explained hereunder.

According to the present invention, the method for making the composite foamed and shaped article including the following main steps:

(1) Preheating a slush molding die;
(2) The first step as mentioned above;

(3) The second step as mentioned above; and (4) The third step as mentioned above.

In the step of preheating the slush molding die, infrared heating is used.

To this end, a gas burner utilizing infrared rays can be used, and at the same time as this heating operation is carried out, an air agitating device for agitating an atmosphere, for example, air, in the heating area can be used. Therefore the slush molding die can be more rapidly and more uniformly heated since a convective heat transfer caused by agitating an atmosphere can be obtained in addition to a radiating heat transfer caused by burning gas.

By this, the slush molding die can be heated more rapidly and more uniformly.

The heating temperature of the slush molding die is selected as desired depending upon conditions such as the kind of thermoplastic resin powder used, although it is generally 250° C. to 270° C.

In the first step, the slush molding die, preheated by infrared rays, is filled with the thermoplastic resin powder.

The thermoplastic resin powder is melted by the heat of the slush molding die to form a first resin layer inside the die.

The first resin layer may be formed either sintered or in not sintered ( melted condition ), but it is preferable that it be sintered.

Vinyl chloride resin is most preferably used as the thermoplastic resin powder.

After the first resin layer is formed in the slush molding die, the die is turned upside down to discharge the surplus thermoplastic resin powder.

In the second step, the slush molding die, in which the first resin layer is formed, is filled with a mixed powder consisting of a heat decomposable foaming agent and the thermoplastic resin powder.

This may be done when the slush molding die, preheated, for example, to 270° C., is gradually cooled and the temperature reaches around 210° C.

The mixed powder is melted by the remaining heat of the slush molding die and adhered to the first resin layer to form the second resin layer.

The decomposable foaming agent is not decomposed and remains in the slush molding die.

After the second resin layer is formed on the surface of the first resin layer, the slush molding die is overturned again to discharge the surplus thermoplastic resin powder.

Up to this point, the slush molding die was gradually cooled to a temperature of around 190° C.

In the third step, the second resin layer in the slush molding die is heated at 210° C.

With this, the decomposable foaming agent contained in the second resin layers decomposed to convert the second resin layer into foam.

After the foamed and shaped article is formed, the slush molding die is cooled and the article taken out.

The second resin layer is heated either by first heating the slush molding die and then heating the second resin layer or directly heating the second resin layer.

The latter is preferable.

Further, heating with hot air is generally preferable.

The slush molding die is preferably cooled by spraying water on the die.

According to the present invention, a composite foamed and shaped article can be obtained which is suitable for the interior of cars or surface fittings of furniture.

In this production process, the time required to obtain a composite foamed and shaped article is shortened since the slush molding die is heated rapidly and uniformly by infrared rays.

Therefore, the method defined in the present invention is suitable for a mass production of the composite foamed and shaped articles.

In a molding process utilizing the powder-slush method, the die must be heated uniformly.

Further, in a continuous molding operation, rapid heating for the die is required.

In the present invention, the infrared heating method is adopted.

Accordingly, the pre-heated dies can be transferred to the first step successively in a short time and can be transferred from the first step to the second step in a short time.

Thus, the second resin layer can be formed without reheating the die in the second step, and the time required to produce one shaped article, i.e., the molding time, can further be shortened.

As one example of the infrared heating method, mention may be made of use of an infrared gas burner.

In this method, infrared radiation is emitted by burning gases in a gas burner made of ceramic fibers.

The heat efficiency is about two times that of the heated air method, i.e., about 60%.

To achieve more uniform heating of the die and to improve the coefficient of irradiation of the infrared radiation to the die, it is preferable that a device for agitating the atmosphere ( air ) be provided in the room in which the the die is irradiated.

Moreover, a coating, for example, alkali silicate may be provided on the surface of the die for accelerating the thermal absorption.

The coating may be provided on the whole surface of the die or on local portions of the die in order to achieve a uniform die temperature. Example Giving a specific example of the steps of the present invention, in the die pre-heating step, a slush molding die made of a Ni-Cu alloy was prepared for making a composite foamed and shaped article suitable for a console box used inside a car.

This was placed in a furnace heated at 500° C. and heated for 90 seconds with infrared radiation from an infrared gas burner in which liquefied petroleum gas was burned. In this operation, an atmosphere was agitated by an agitating device. The temperature of the molding die was 250° C.

In the first step, the die, preheated to 250° C. was filled with a thermoplastic resin powder and a skin-forming operation carried out for 10 seconds to form a sintered first resin layer.

The molding die was then overturened to discharge the surplus thermoplastic resin powder.

This step required 30 seconds.

In the second step, the die was filled with a mixed powder consisting of a heat decomposable foaming agent and the thermoplastic resin powder and a skin-forming operation carried out for 10 seconds to form a second resin layer on the surface of the first resin layer.

At this stage, the temperature of the die was 210° C.

Thereafter, the die was overturned to discharge the surplus thermoplastic resin powder.

This step required 30 seconds.

In the third step, the die was inserted into a hot air circulating furnace maintained at a temperature of 250° C. was heat treated for about 20 seconds to cause the second resin layer to foam.

The die was then inserted into a cooling chamber and sprayed with cooling water for 20 seconds.

The foamed and shaped article was manually released from the die.

The total time for molding the resin in this embodiment (molded time) was 4 minutes.

As explained above, in accordance with the method for making a composite foamed and shaped article of the present invention, the total time required to produce one shaped article, i.e., the molding time, can be further shortened and a method suitable for mass production of composite foamed and shaped articles can be obtained.

I claim:

1. A method for making a composite foamed and shaped article comprising:
    a first step in which a heated slush molding die is filled with a thermoplastic resin powder to form a first resin layer and then the surplus thermoplastic resin powder is discharged;
    a second step in which said die with said first resin layer formed therein is filled with a mixed powder consisting of a heat decomposable foaming agent and a thermoplastic resin powder, the remaining heat of said die is utilized while said mixed powder is brought into contact with said first resin layer to form a second resin layer, and the surplus mixed resin powder is discharged; and
    a third step in which said second resin layer is subjected to heat treatment to cause a foaming thereof, said die is cooled, and said foamed and shaped article is then taken out of said mold;
    wherein said slush molding die in which said thermoplastic resin powder is contained later is heated, before said first step is carried out, by an infrared heating method utilizing an infrared gas burner in an atmosphere in which air is agitated by an air agitating device.

2. The method of claim 1, wherein the temperature of said heated slush molding die in said first step ranges from about 250° C. to about 270° C.

3. The method according to claim 1, wherein said thermoplastic resin powder of said first step is sintered to form said first resin layer.

4. The method according to claim 1, wherein said thermoplastic resin powder comprises vinyl chloride.

5. The method according to claim 1, wherein said second resin layer absorbs heat from said first resin layer until said slush molding die reaches a temperature of about 190° C. to about 210° C.

6. The method according to claim 1, wherein said second resin layer in said third step is heated at a temperature of about 210° C. to about 250° C.

7. The method according to claim 1, wherein said second resin layer in said third step is heated indirectly by heating said slush molding die which then heats said second resin layer via said first resin layer.

8. The method according to claim 1, wherein said second resin layer in said third step is heated directly.

9. The method according to claim 1, wherein said second resin layer in said third step is heated with hot air.

10. The method according to claim 1, wherein said slush molding die in said third step is cooled by spraying water on said slush molding die.

11. The method according to claim 1, further comprising agitating the air surrounding said slush molding die simultaneous to said heating in said third step.

12. The method according to claim 11, wherein said agitating simultaneous to said heating comprises heating said slush molding die in a hot air circulating furnace.

13. The method according to claim 1, wherein said slush molding die is coated with a composition effective in accelerating thermal absorption of said slush molding die.

14. The method according to claim 13, wherein said coating on said slush molding die comprises alkali silicate.

15. The method according to claim 13, wherein said coating on said slush molding die covers less than the entire surface of said slush molding die, the location of said coating selected so as to effect a uniform heating of said slush molding die.

16. The method according to claim 1, wherein said slush molding die comprises a Ni-Cu alloy.

17. The method according to claim 1, wherein said first step or said second step is completed in about 30 seconds.

18. The method according to claim 1, wherein the combination of said first, said second and said third steps is completed in about 4 minutes.

* * * * *